(12) United States Patent
Rogers, Jr. et al.

(10) Patent No.: US 6,481,783 B1
(45) Date of Patent: Nov. 19, 2002

(54) DRIVE MECHANISM FOR POWER OPERATED SLIDEABLE SIDE DOOR

(75) Inventors: Lloyd Walker Rogers, Jr., Shelby Township, MI (US); Jeff S Hamminga, Warren, MI (US); Michael Todd Moury, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/978,908

(22) Filed: Oct. 16, 2001

Related U.S. Application Data
(60) Provisional application No. 60/286,418, filed on Apr. 25, 2001.

(51) Int. Cl.$^7$ ................................................. B60J 5/06
(52) U.S. Cl. ........................................ 296/155; 49/360
(58) Field of Search .................... 296/155; 160/310; 74/625; 49/360, 118, 120, 280

(56) References Cited

U.S. PATENT DOCUMENTS

| | | | | |
|---|---|---|---|---|
| 4,932,715 A | * | 6/1990 | Kramer | 296/155 |
| 5,138,795 A | * | 8/1992 | Compeau et al. | 49/360 |
| 5,233,789 A | * | 8/1993 | Priest et al. | 49/360 |
| 5,316,365 A | | 5/1994 | Kuhlman et al. | |
| 5,319,881 A | * | 6/1994 | Kuhlman | 49/360 |
| 5,323,570 A | * | 6/1994 | Kuhlman et al. | 49/360 |
| 5,906,071 A | * | 5/1999 | Buchanan, Jr. | 49/360 |
| RE36,428 E | * | 12/1999 | Moore et al. | 296/155 |
| 6,036,257 A | * | 3/2000 | Manuel | 296/155 |
| 6,087,794 A | * | 7/2000 | Kawanobe | 49/360 |
| 6,256,930 B1 | * | 7/2001 | Faubert et al. | 49/362 |
| 6,390,516 B1 | * | 5/2002 | Kobayashi | 49/280 |
| 6,390,535 B1 | * | 5/2002 | Chapman | 296/155 |
| 2002/0043818 A1 | * | 4/2002 | Fukumoto et al. | 296/155 |

* cited by examiner

*Primary Examiner*—Kiran Patel
(74) *Attorney, Agent, or Firm*—Kathryn A. Marra

(57) ABSTRACT

A passenger van is equipped with a drive mechanism for power operation of a slideable side door. The drive mechanism has a flexible drive member that travels in a closed loop which includes travel through a center track that supports and guides a hinge and roller assembly that is attached to the rear of the side door. The flexible drive member has a cogged portion that is driven by an electric motor to open and close the side door. The remaining portion is uncogged for economy o f manufacture and for releasing the flexible drive member from a clutch of the hinge and roller assembly to open the side door manually very easily. An electromagnetic clutch may also be included to reduce manual operating effort.

10 Claims, 2 Drawing Sheets

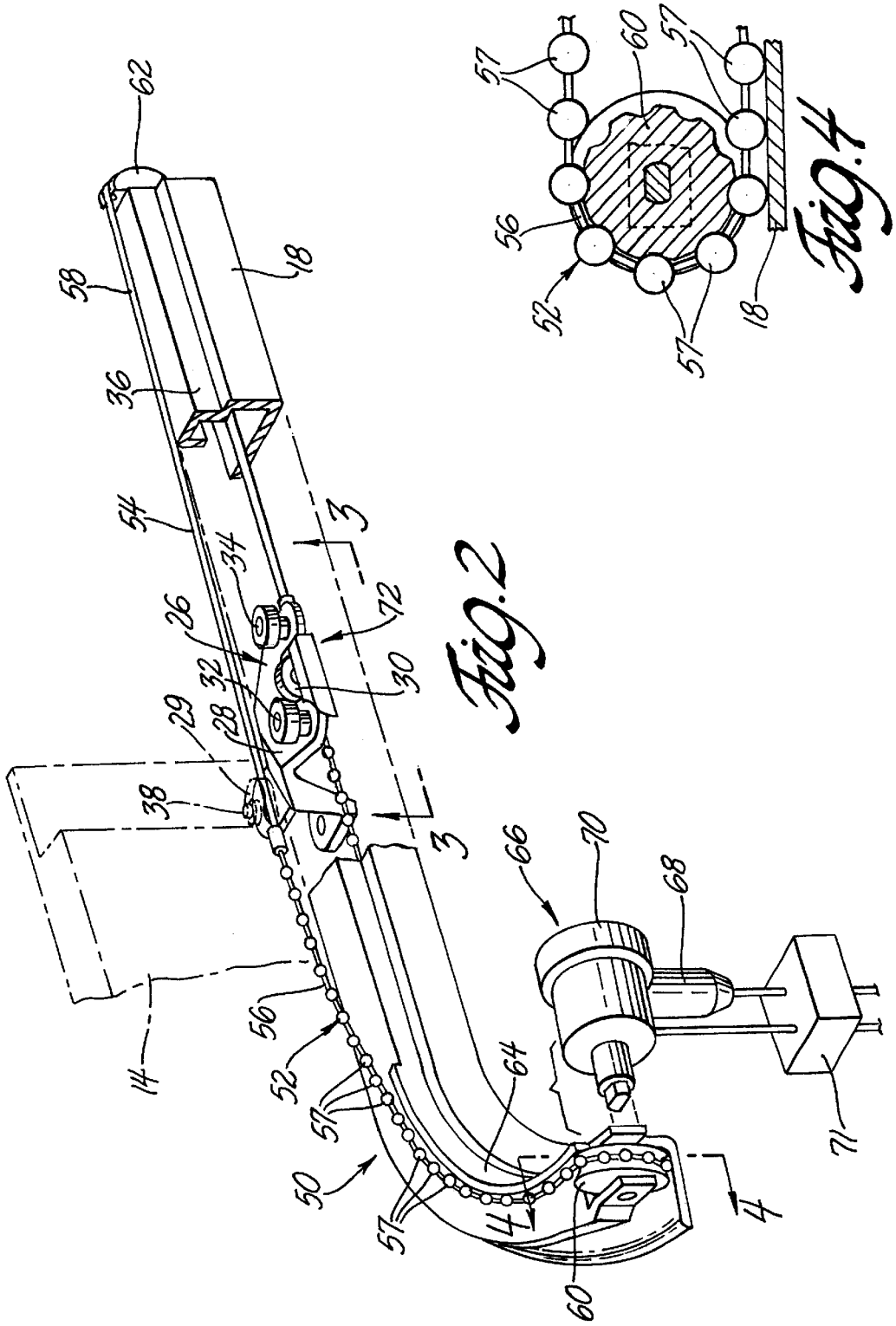

DRIVE MECHANISM FOR POWER OPERATED SLIDEABLE SIDE DOOR

RELATED APPLICATION

This patent application claims benefit of U.S. Provisional patent application 60/286,418 filed Apr. 25, 2001.

FIELD OF THE INVENTION

This invention relates to automotive vehicles having a slideable side door and more particularly to a drive mechanism for a power operated slideable side door.

BACKGROUND OF THE INVENTION

U.S. Pat. No. 5,316,365 granted to Howard W. Kuhlman and Jeffrey K. Joyner May 31, 1994 discloses a passenger van that has a slidable side door. The door is supported on and slideable in three tracks. A module for power operation of the door is mounted inside the van adjacent to the center track that supports and guides the rear of the door. The module includes a front cable and a rear cable. The front cable is attached to a front cable drive pulley, then extends through a front cable roller guide assembly and is then attached to a hinge and roller assembly. The rear cable is attached to a rear cable drive pulley then extends through a rear cable roller guide, assembly, and is then attached to the hinge and roller assembly. The front and rear cable drive pulleys are driven by an electric motor via an electromagnetic clutch to open and close the sliding door. The electromagnetic clutch permits manual opening and closing of the side door when it is disengaged, thus avoiding the need to back drive the electric motor. However, the cables and pulleys are part of a complicated system and must be back driven during manual operation which could be a disadvantage particularly in a manual opening operation.

SUMMARY OF THE INVENTION

This invention provides a drive mechanism for power operation of a slideable side door of an automotive vehicle, such as a passenger van. The drive mechanism has an flexible drive member that travels in a closed loop, a portion of which is through a track that supports and guides a hinge and roller assembly that is attached to the door. The flexible drive member is attached to the hinge and roller assembly is a composite having a cogged portion that is driven an electric motor to open and close the door. The remainder of the flexible drive member is uncogged for economy of manufacture. The hinge and roller assembly preferably has a normally engaged clutch that clamps the hinge and roller assembly to the flexible drive member for power operation of the door. The clutch can be disengaged manually to open the door manually very easily because neither the flexible drive member nor the electric motor need be back driven. The drive mechanism also includes an optional electromagnetic clutch that is driven by the electric motor and that in turn drives the cogged portion of the flexible drive member. The electromagnetic clutch is de-energized after each power opening or power closing to make a subsequent manual opening or closing easier because neither the electromagnetic clutch nor the electric motor need be back driven.

BRIEF DESCRIPTION OF THE DRAWINGS

FIG. 2 is a schematic perspective view of the drive mechanism for opening and closing the sliding side door shown in FIG. 1;

FIG. 4 is a section taken substantially along the line 4—4 of FIG. 2 looking in the direction of the arrows.

DESCRIPTION OF THE PREFERRED EMBODIMENT

Figure 1:
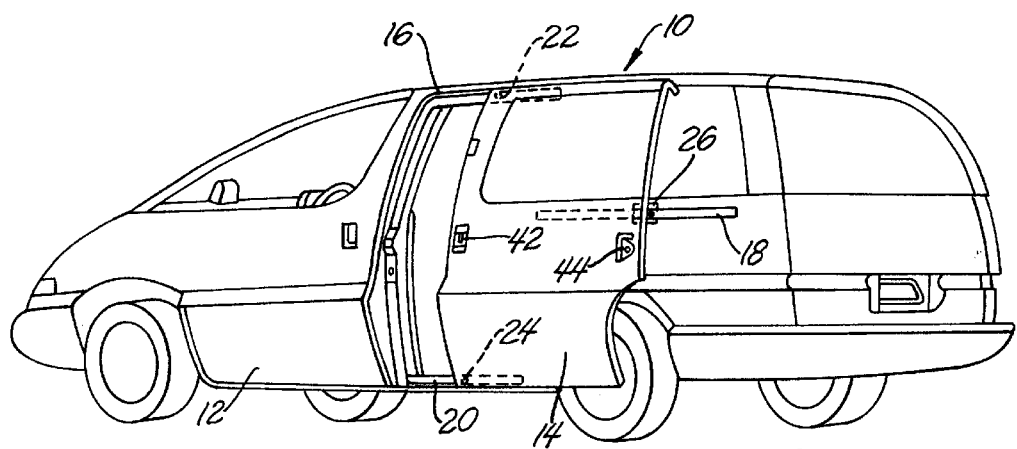
FIG. 1 is a side view of a passenger van equipped with a sliding side door of the invention.

Referring now to FIGS. 1 and 2, an automotive vehicle, such as a passenger van 10 has a hinged front door 12 on each side of the vehicle and at least one sliding side door 14 behind the front doors that may be power driven. Such vehicles are well known and need not be described in detail. See for instance the Kuhlman '365 patent discussed above.

The power sliding door 14 is supported and guided by an upper track 16, a center track 18, and a lower track 20 as shown in FIG. 1. An upper hinge and roller assembly 22 is attached to the upper forward corner of the power sliding door and runs in the upper track 16. A lower hinge and roller assembly 24 is attached to the lower forward corner of the power sliding door and runs in the lower track 20. A hinge and roller assembly 26 is pivotally attached to the rear portion of the power sliding door 14 between the upper and lower portions of the power sliding door.

Figure 3:
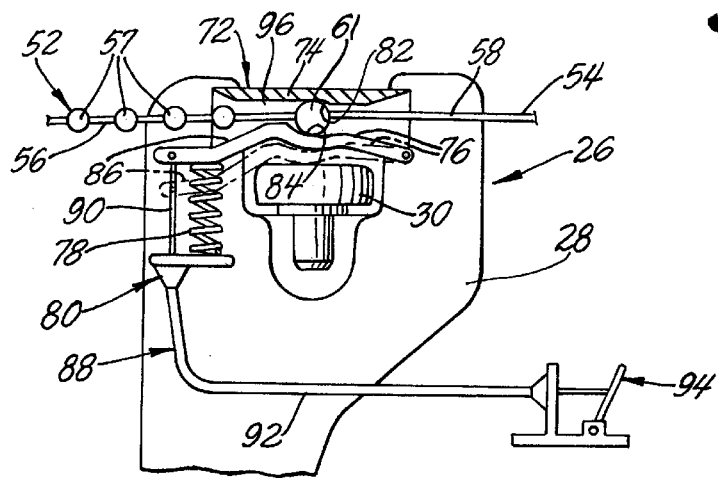
FIG. 3 is an enlarged bottom view of a hinge and roller assembly in the drive mechanism shown in FIG. 2 taken substantially along the line 3—3 looking in the direction of the arrows.

Referring now to FIGS. 2 and 3, the hinge and roller assembly 26 has a carriage 28. A support roller 30 pivotally attached to carriage 28 for rotation about a generally horizontal axis, supports the rear portion of door 14 and runs in the center track 18. Two guide rollers 32 and 34 are pivotally attached to carriage 28 for rotation about generally vertical axes and run in an upper channel portion 36 of the center track 18. A vertical hinge pin 38 passes through a pair of hinge apertures in carriage 28 and through hinge apertures in a bracket 29 attached to the rear edge of the power sliding door 14 to connect carriage 28 to power sliding door 14.

The power sliding door 14 moves horizontally inward toward the center of the van 10 for latching and sealing. Latches 42 and 44 are provided at the front and rear of the power sliding door 14 which moves horizontally inward to compress resilient seals and to latch. Inward horizontal movement of the sliding door 14 is obtained by curving the forward ends of the upper, center and lower tracks 16, 18 and 20 inwardly toward the center of van 10. When the hinge and roller assembly 26 passes around the curved forward end 45 of center track 18, the hinge and roller assembly 26 pivots inwardly and moves the rear portion of side door 14 horizontally inward toward the side of van 10.

The drive mechanism 50 for opening and closing the side door 14 comprises the hinge and roller assembly 26 and further includes a flexible drive member 52 that travels in a closed loop with a portion of the loop disposed in track 18 along the entire length of the track as best shown in FIG. 2. The portion of the loop disposed in track 18 travels in close proximity to the hinge and roller assembly 26. Flexible drive member 52 is an endless cable 54 that has a cogged portion 56 and an uncogged portion 58. Cogged portion 56 includes a plurality of round beads 57 that are spaced longitudinally along cable 54. Uncogged portion 58 includes a master link 60 near one end of cogged portion 58 as best shown in FIG. 3. Master link 60 is also preferably a round bead that is larger than the round beads 57 of cogged portion 56.

A unique flexible drive member that is made as described below provides a suitable flexible drive member 52.

A front pulley 60 engages the flexible drive member 52 at a front end of track 18 and a rear cable guide 62 engages the flexible drive member 52 at a rear end of the track 18. Cable guide 62 may be stationary as shown or may be a rotatable pulley (not shown). A portion of the loop that is disposed outside the track 18 runs between front pulley 60 and rear cable guide 62. The portion outside track 18 is guided by a fence 64 at the curved front end of track 18, or by some other guide that may or may not be an integral part of track 18.

A drive assembly 66 is attached to van 10 in any suitable manner. Drive assembly 66 comprises an electric motor 68 that drives an electromagnetic clutch 70. Clutch 70 in turn drives front pulley 60 which is configured as a sprocket to drive the cogged portion 56 of cable 54 as best shown in FIG. 4.

The hinge and roller assembly 26 includes a clutch 72 for clamping hinge and roller assembly 26 to the flexible drive member 52 as best shown in FIG. 3. Clutch 72 comprises a stationary wall 74 at an inner end of carriage 28, a clamp arm 76 that is pivotally attached to the carriage 28 outwardly of the stationary wall 74, a spring 78 that biases the clamp arm 76 toward the stationary wall 74 and an actuator 80 for pivoting the clamp arm 76 away from the stationary wall 74. Wall 74 includes a stop shoulder 82 engaged by master link 60 to pull hinge and roller assembly 26 rearward, that is toward the right as viewed in FIGS. 2 and 3, when flexible drive member 52 is driven counterclockwise by drive assembly 66.

Clamp arm 76 includes a cradle 84 that is sized to receive a portion of master link 61 and hold master link 61 against wall 74 and juxtaposed stop shoulder 82 when clamp arm 76 is in an engaged position as shown in FIG. 3. Clamp arm 76 is held in the engaged position by spring 78. In this engaged position, master link 61 engages cradle 84 to pull hinge and roller assembly 26 forward, that is toward, the left as viewed in FIGS. 2 and 3 when flexible drive member 52 is driven clockwise. Clamp arm 76 also includes a ramp 86 between cradle 84 and the free end of the clamp arm 76. Ramp 86 guides master link 61 into a nested position in cradle 84 as explained below.

Actuator 80 comprises a conventional pull cable 88 having a core 90 that moves within a sheath 92. One end of the core 90 is attached to the free end of clamp arm 76 and the adjacent end of the sheath 92 is attached to cradle 28 as shown in FIG. 3. The opposite end of pull cable 88 may be attached to a manual release lever 94 or another operator, such as a door handle (not shown), that is operated in the manner of a manual release lever.

Drive mechanism 66 operates in the following manner. In order to power open side door 14, electric motor 66 and electromagnetic clutch 70 are energized by a control 71 to rotate sprocket 60 counterclockwise. This drives the cogged portion 56 of flexible drive member 52 so that the flexible drive member 52 travels in a closed loop in a counterclockwise direction. Flexible drive member 52 thus pulls hinge and roller assembly 26 and side door 14 that is attached to the assembly rearward from a closed position to an open position, that is, to the right as viewed in FIG. 2. When side door 14 is fully open, electric motor 66 and electromagnetic clutch 70 are de-energized by any well know technique, such as by operating a limit switch or electronic circuit that sends a signal to control 71.

For a power closure, electric motor 66 and electromagnetic clutch 70 are energized by control to rotate sprocket 60 clockwise so that the cogged portion 56 is driven in the opposite direction and flexible drive member 52 travels clockwise in the loop as viewed in FIGS. 2 and 3. This moves side door 14 to the left to the closed position. When side door 14 is fully closed, electric motor 66 and electromagnetic clutch 70 are deenergized by control 71. Thus cogged portion 56 need only be long enough to move side door 14 from the closed position to the open position, or stated another way, from the open position to the closed position, which is the same length.

Controls for electric motors and electromagnetic clutches are well know and consequently control 71 is not illustrated in detail because any suitable control may be used.

In addition to the power operation described above, side door 14 can be closed or opened manually without much effort because electromagnetic clutch 70 is deenergized so that side door 14, hinge and roller assembly 26, and flexible drive member 52 can be moved without the necessity of back driving the electromagnetic clutch 70 and the electric motor 68.

As another alternative, the side door 14 can be open manually with even less effort by operating release lever 94 to pull clamp arm 76 away from wall 74 to the disengaged position shown in phantom in FIG. 3A. When clamp arm 76 is in the disengaged position, master link 61 can pass through passage 96 between wall 74 and clamp arm 76 forwardly of stop shoulder 82. Consequently, side door 14 and hinge and roller assembly 26 can be pulled to the open position without the necessity of moving the flexible drive member 52 because the uncogged portion 58 simply slides through the passage 96 of clutch 72 after master link 61 passes by cradle 84. Moreover, the side door 14 can be opened manually very easily when the master link 60 is released even if the electromagnetic clutch 70 is not disengaged for one reason or another or even if the flexible drive member 52 is jammed for one reason or another. After the side door 14 is opened in this manner, the side door 14 can then be closed manually or with power. The manual closing of side door 14 is essentially as easy as the manual opening because the uncogged portion 58 of the flexible drive member 52 simply slides back through passage 96 of clutch 72 as the side door 14 is being closed. As the side door 14 nears its final closed position, master link 60 engages ramp 86 and cams clamp arm 76 away from wall 74 against the action of spring 78. When master link 60 reaches cradle 84, spring 78 biases clamp arm 76 to the engaged position shown in solid line in FIG. 3.

The manual release operator, such as manual release lever 94, preferably provides a feed back to control 71 so that the motor 68 and electromagnetic clutch 70 of drive assembly 66 do not operate when the manual release operator is actuated for the manual opening described above. It should be noted that the side door 14 can also be power closed after such a manual opening. Electric motor 68 and electromagnetic clutch 70 are first energized to drive hinge and roller assembly 26 via flexible drive member 52 from the closed position to the open position in which case the master link 60 reconnects to hinge and roller assembly 26 as described above in connection with the manual closing. Electric motor 68 and electromagnetic clutch 70 are then energized to drive hinge and roller assembly 26 via flexible drive member 52 from the open position to the closed position.

The manual release actuator 94 can be actuated at any time to move the side door 14 to the fully open position and thus the side door 14 can be moved from a partially open position to a fully open position. Thus the invention contemplates a control 71 that is responsive to the position of the master link 60 as well as the position of the hinge and roller assembly 26.

The first embodiment of the invention provides significant operational advantages in addition to the savings brought about by using a partially cogged drive member 52

Figure 5:
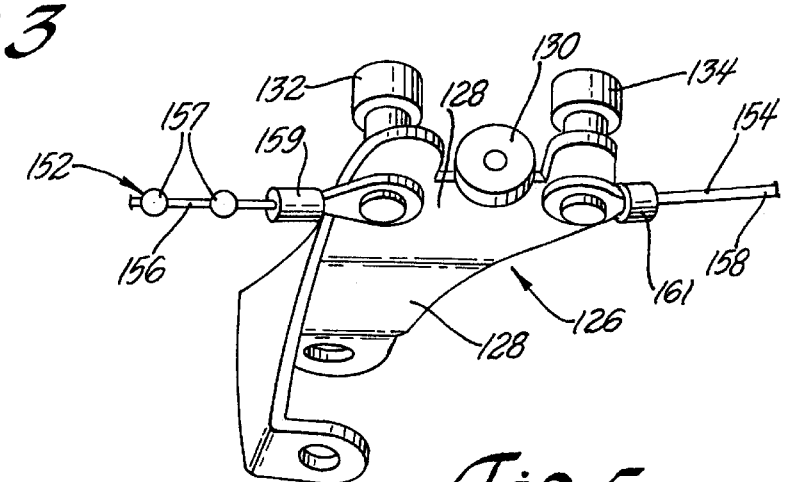
FIG. 5 is an enlarged perspective view of an alternate hinge and roller assembly for the drive mechanism shown in FIG. 2.

FIG. 5 shows an alternative hinge and roller assembly 126 that can be used in place of the hinge and roller assembly 26 shown in FIGS. 1, 2, 3 and 4. Hinge and roller assembly 126 is substantially identical to hinge and roller assembly 26 with respect to the mechanical parts that are used to support and guide the side door 14 in track 18 and these parts are labeled with by adding 100 to the identifying numerals. However, the clutch 72 has been eliminated and the flexible drive member 152 is now fixed to the hinge and roller assembly 126.

In this case, the cable 154 can be split and the master link 60 can be eliminated. One end of the cogged portion 156 is then attached to a forward portion of carriage 128 by a connector 159 while the adjacent end of the uncogged portion 158 is attached to a rearward portion of carriage 128 by a second connector 161. Such an arrangement in effect provides an endless cable. Alternatively a continuous cable loop or a continuous cable loop with a master link can be used as in the first embodiment. In either case, the continuous cable loop cable can be attached to the carriage 128 by a single connector. Moreover, if the continuous cable loop includes a master link, such as master link 60, the master link can be used to attach the continuous cable loop to the carriage 128.

This power operation of the second embodiment of the invention works substantially in the same way as the first embodiment. To power operate the side door 14, electric motor 68 and electromagnetic clutch are energized by control 71 to drive sprocket 60 in one direction or the other to drive flexible drive member 152 clockwise or counterclockwise to open or close side door 14. When side door 14 is fully closed or fully open, electric motor 68 and electromagnetic clutch are deenergized by control so that side door 14 can still be opened and closed manually without much effort whenever a manual operation is desired or necessary because of a power failure.

However, as indicated above, clutch 72 has been eliminated so that the flexible drive member must be back driven in all manual operations. Thus the second embodiment provides most of the operational advantages of the first embodiment while retaining the economy brought about by using a partially cogged flexible drive member 152.

While specific embodiments have been illustrated, other embodiments are possible. For instance, the electromagnetic clutch 70 can be eliminated in either the first or the second embodiment to retain the economy brought about by using a partially cogged flexible drive member. The partially cogged flexible drive member not only realizes economy in construction of the flexible drive member itself but also provides an additional economy in that the flexible drive member is pulled to open the side door and pulled to close the side door, thus eliminating any need for tensioners in the drive mechanism 50.

Moreover, while the preferred embodiments are illustrated with a drive pulley 60 and only one cable guide 60 for driving and guiding the flexible drive member 52 additional guides, both stationary and rotary can be used to establish the travel loop for the flexible drive member 52. Furthermore, the parts of the drive mechanism can be rearranged so that the sprocket 60, motor 68 and electromagnetic clutch 70 are at a rear end of track 18. In other words, while preferred embodiments of the invention have been shown and described, other embodiments will now become apparent to those skilled in the art. Accordingly, the invention is not to be limited to that which is shown and described but by the following claims.

We claim:

1. A drive mechanism for a power operated slideable side door that is attached to a hinge and roller assembly that travels in a track of a vehicle comprising:
   a flexible drive member,
   means to drive the flexible drive member in a loop so that a portion of the loop travels in the track juxtaposed the hinge and roller assembly,
   the flexible drive member having a cogged portion and an uncogged portion.

2. The drive mechanism as defined in claim 1 wherein the flexible drive member comprises a cable and the cogged portion comprises a plurality of beads spaced along the cable.

3. The drive mechanism as defined in claim 2 wherein the cogged portion engages a sprocket that is part of the means to drive the flexible drive ment in a loop.

4. A drive mechanism for a power operated slideable side door that is attached to a hinge and roller assembly that travels in a track of a vehicle comprising:
   an endless flexible drive member,
   means to drive the endless flexible drive member in a loop so that a portion of the loop travels in the track juxtaposed the hinge and roller assembly,
   a sprocket that is part of the means to drive the endless flexible drive member and that is attached to the track near one end,
   the flexible drive member comprising a cable having a cogged portion and an uncogged portion, the cogged portion comprising a plurality of cogs spaced along the cable.

5. The drive mechanism as defined in claim 4 wherein the flexible drive member is attached to the hinge and roller assembly.

6. The drive mechanism as defined in claim 4 wherein the flexible drive member is attached to the hinge and roller assembly by a clutch.

7. A drive mechanism for a power operated slideable side door that is attached to a hinge and roller assembly that travels in a track of a vehicle comprising:
   an endless flexible drive member,
   means to drive the endless flexible drive member in a loop so that a portion of the loop travels in the track juxtaposed the hinge and roller assembly,
   a sprocket that is part of the means to drive the endless flexible drive member and that is attached to the track near one end,
   the flexible drive member comprising a cable having a cogged portion and an uncogged portion,
   the cogged portion engaging the sprocket and comprising a plurality of cogs spaced along the cable,
   the uncogged portion having a master link near an end of the cogged portion of the cable,
   a clutch mounted on the hinge and roller assembly,
   the clutch engaging the master link to attach the uncogged portion of the cable to the hinge and roller assembly when the clutch is engaged.

8. The drive mechanism as defined in claim 7 wherein the master link is larger than the cogs of the cogged portion and wherein the clutch comprises a stationary wall of the hinge and roller assembly and a clamp arm that is pivotally attached to the hinge and roller assembly.

9. The drive mechanism as defined in claim 8 wherein the clamp arm is spring biased to an engaged position, wherein the stationary wall has stop shoulder that engages the master link when the clamp arm is in the engaged position and the hinge and roller assembly is pulled in one direction, and wherein the clamp arm has a cradle that engages the master link when clamp arm is in the engaged position and the hinge and roller assembly is pulled in an opposite direction.

10. The drive mechanism as defined in claim 9 further including an actuator for moving the clamp to a disengaged position and wherein the clamp arm has a ramp between a free end of the clamp arm and the cradle.

* * * * *